FEEDING APPARATUS

Original Filed Jan. 26, 1962 3 Sheets-Sheet 1

INVENTOR.

Robert M. Carrier, Jr.,
By Hofgren, Brady,
Wegner, Allen & Stellman
Attys.

FEEDING APPARATUS

Original Filed Jan. 26, 1962 3 Sheets-Sheet 3

United States Patent Office

Re. 26,291
Reissued Oct. 31, 1967

26,291
FEEDING APPARATUS

Robert M. Carrier, Jr., Jeffersonville, Ind., assignor to Carrier Manufacturing Co., a corporation of Kentucky Original No. 3,187,884, dated June 8, 1965, Ser. No. 169,051, Jan. 26, 1962. Application for reissue May 11, 1966, Ser. No. 552,675
10 Claims. (Cl. 198—220)

Matter enclosed in heavy brackets [ ] appears in the original patent but forms no part of this reissue specification; matter printed in italics indicates the additions made by reissue.

This invention relates to a feeding apparatus and more particularly to a vibratory type feeder in which the rate of feed of pulverulent material can be accurately controlled.

It is the general object of the present invention to produce a new and improved vibratory feeder of the character described.

It is a more specific object of the invention to produce a vibratory feeder adapted for the feeding of granular or pulverulent material so constructed and arranged that the rate of feed can be maintained at a predetermined desired constant value.

In many processes, various materials are to be mixed together in predetermined ratios. Where some of the materials are granular or pulverulent in form, it is often difficult to provide for a predetermined constant rate of feed of the material, particularly in a continuous process. Furthermore, even where apparatus has been designed and constructed to provide a more or less constant feed, difficulty is often encountered when the rate of feed is to be changed and normally drastic changes in construction must be made before radical changes in feed rate can be achieved.

According to the present invention, however, there is provided a feeder for feeding granular material which is not only capable of feeding the material in a predetermined desired quantity or rate, thus lending itself particularly useful in continuous processes, but also a feeder whose rate of feed can very easily be changed without affecting the accuracy or reliability of the device.

It is therefore another object of the present invention to produce a feeder for feeding predetermined quantities of pulverulent material in which the quantity may be varied simply and accurately through a relatively wide range.

Other and further objects and advantages of the present invention will be readily apparent from the following description and drawings, in which.

Figure 1:
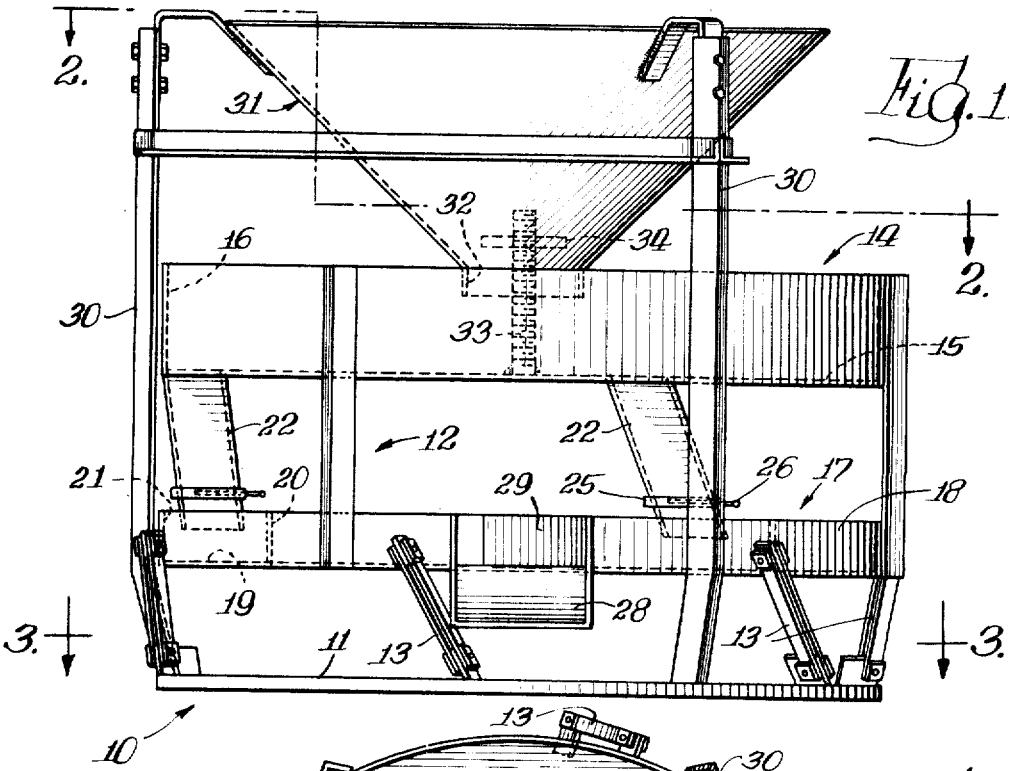
FIG. 1 is a side elevational view of an apparatus embodying the invention.

While this invention is susceptible of embodiment in many different forms, there is shown in the drawings and will herein be described in detail several embodiments, with the understanding that the present disclosure is to be considered as an exemplification of the principles of the invention and is not intended to limit the invention to the embodiments illustrated. The scope of the invention will be pointed out in the appended claims.

Referring now to the drawings, it will be noted from FIG. 1 that the device of the embodiment shown therein is provided with a base 10 in the form of a circular plate 11 supporting a frame 12 by means of a plurality of supports 13. The supports 13 comprise spaced strips of flexible spring-like metal which permit a limited amount of rotational movement of the frame relative to the base.

Carried by the frame is a first circular feeder 14 having a bottom 15 and an outer side wall 16 defining therein a feed channel having an open top. Mounted in the frame below the feeder 14 is a second feeder 17 in the form of a circular channel 18 having a bottom 19 and sides 20 and 21.

Means are provided for establishing communication between the first feeder 14 and the second feeder 17, such means taking the form of passages 22, each having one end 23 opening to the bottom of the feeder 14 and its other end 24 opening into the feeder 17. Each of the passages is controlled by means of a slidable gate 25 adjustable through the medium of slide rods 26. The bottom feeder 17 is provided with a discharge spout 28 which in cooperation with a dam 29 extending across the feeder 17 directs material moving therein outwardly of the feeder and into the discharge spout.

Also carried by the base 10 on legs 30 is a supply hopper 31 mounted over the upper feeder 14 and provided with a discharge spout 32 opening into the feeder 14. A threaded rod 33 carries circular plug 34, the plug threadedly engaging the rod so that rotation thereof moves the same toward or away from the discharge spout 32 to regulate somewhat the flow of material from the spout into the feeder. It will be noted that the lower end of spout 32 is located below the tip of wall 16.

Means are provided for vibrating the frame thereby to vibrate the upper and lower feeders 14 and 17 in the direction permitted by the supports 13. For this purpose, a motor 35 is mounted on the base plate 11 and drives a belt 36 engaging a pulley 37 mounted on a shaft 38 rotatably carried in bearings 39 secured to the plate 11. At each end of the shaft 38 there is provided an eccentric portion 40 carried by bearings 41 secured by brackets 42 to the channel 18. The apparatus just described serves to vibrate the channel and hence the frame and upper and lower feeders.

Figure 2:
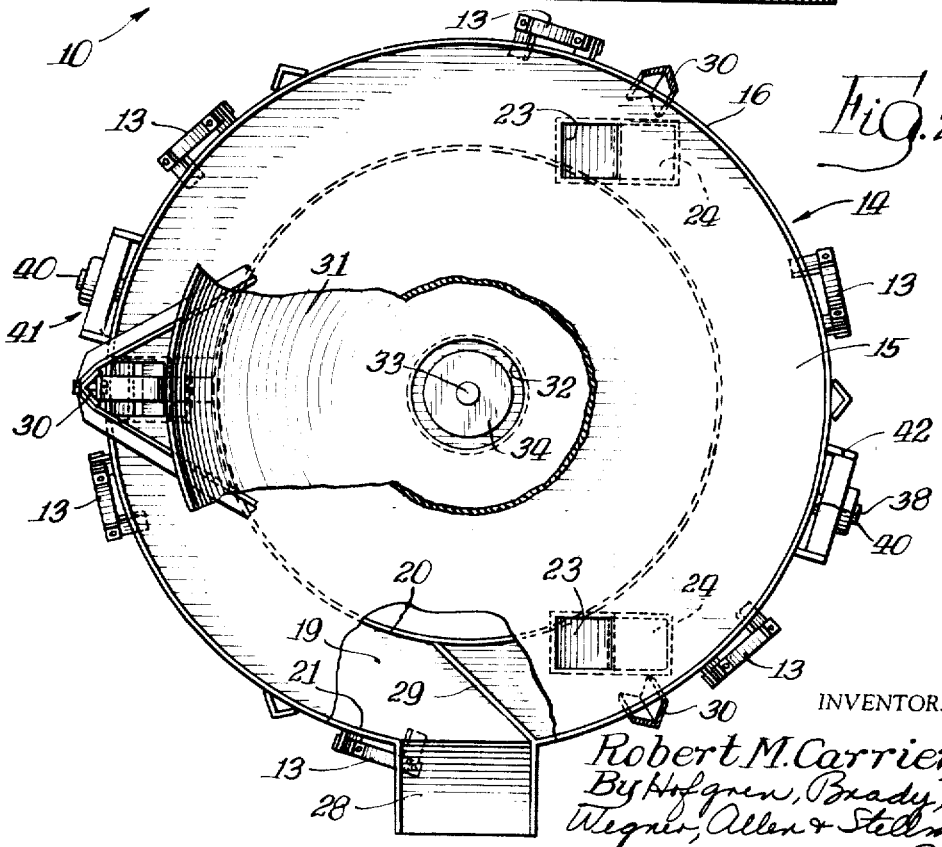
FIG. 2 is a horizontal sectional view taken along line 2—2 of FIG. 1.
Figure 3:
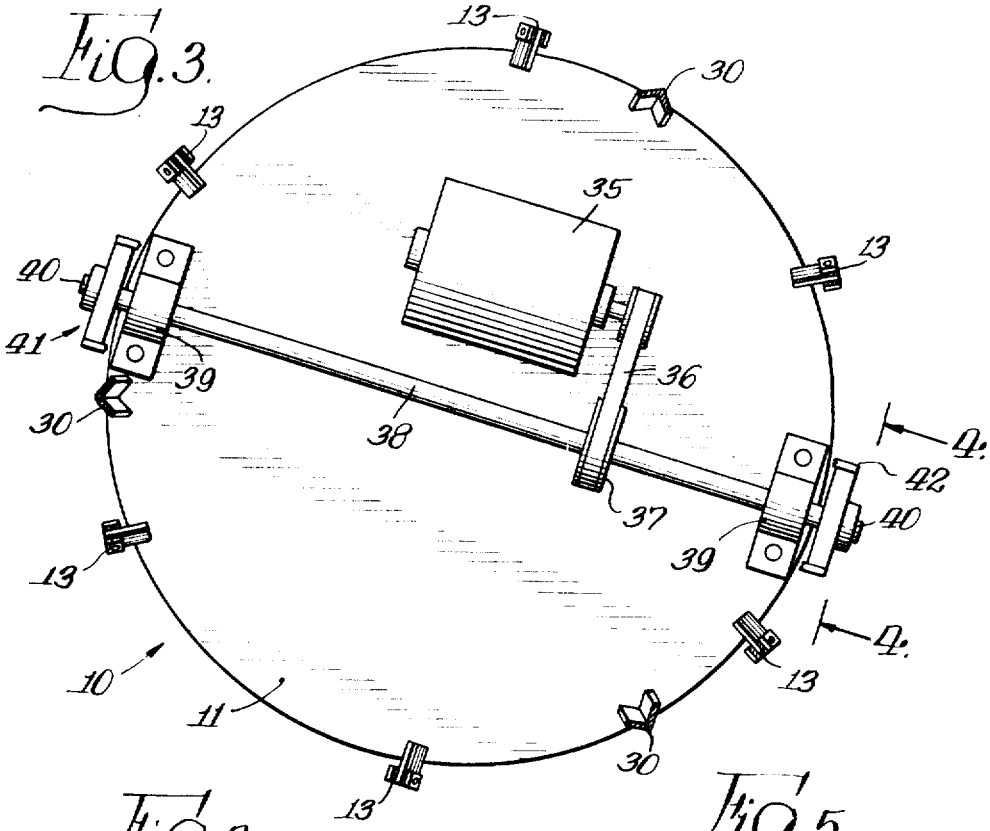
FIG. 3 is a horizontal sectional view taken along line 3—3 of FIG. 1.
Figure 4:
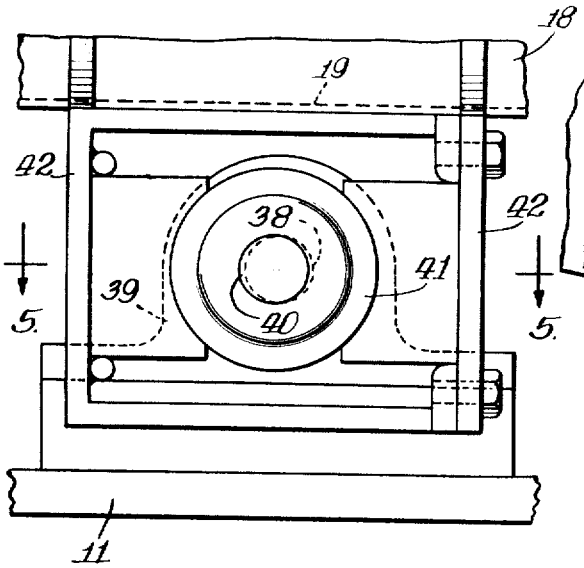
FIG. 4 is an enlarged detail side elevational view indicated by the line 4—4 of FIG. 3.
Figure 5:
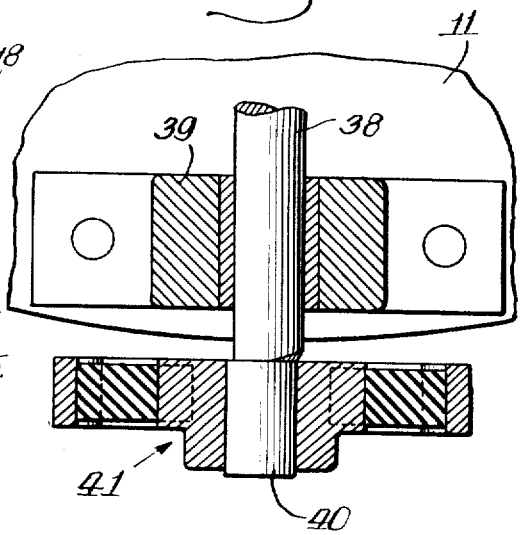
FIG. 5 is an enlarged sectional view taken along line 5—5 of FIG. 4.

In operating the apparatus shown in FIGS. 1–5, material to be fed is placed in the hopper 31 for flow into the upper feeder 14. With the motor 35 running, the upper and lower weeders are vibrated rotationally generally in their plane thus moving the material in the upper feeder 14 in a counterclockwise direction as seen in FIG. 2 and with the hopper being filled from time to time maintains the material at a substantially constant level therein. Material moving in a generally circular or, more accurately, outwardly spiraling path in the feeder 14 eventually passes over one of the openings 23 communicating with the passages and thereby flowing into the lower feeder 17 with the rate of flow being regulated, of course, by adjustment of the gates controlling the passages. Inasmuch as the arrangement shown will provide for a substantially uniform depth of material in the upper feeder 14 the flow to the low feeder 17 is constant and the material delivered thereto through the passages moves around the feeder until it encounters the dam 29 which directs it outwardly into the discharge spout 28.

Figure 6:
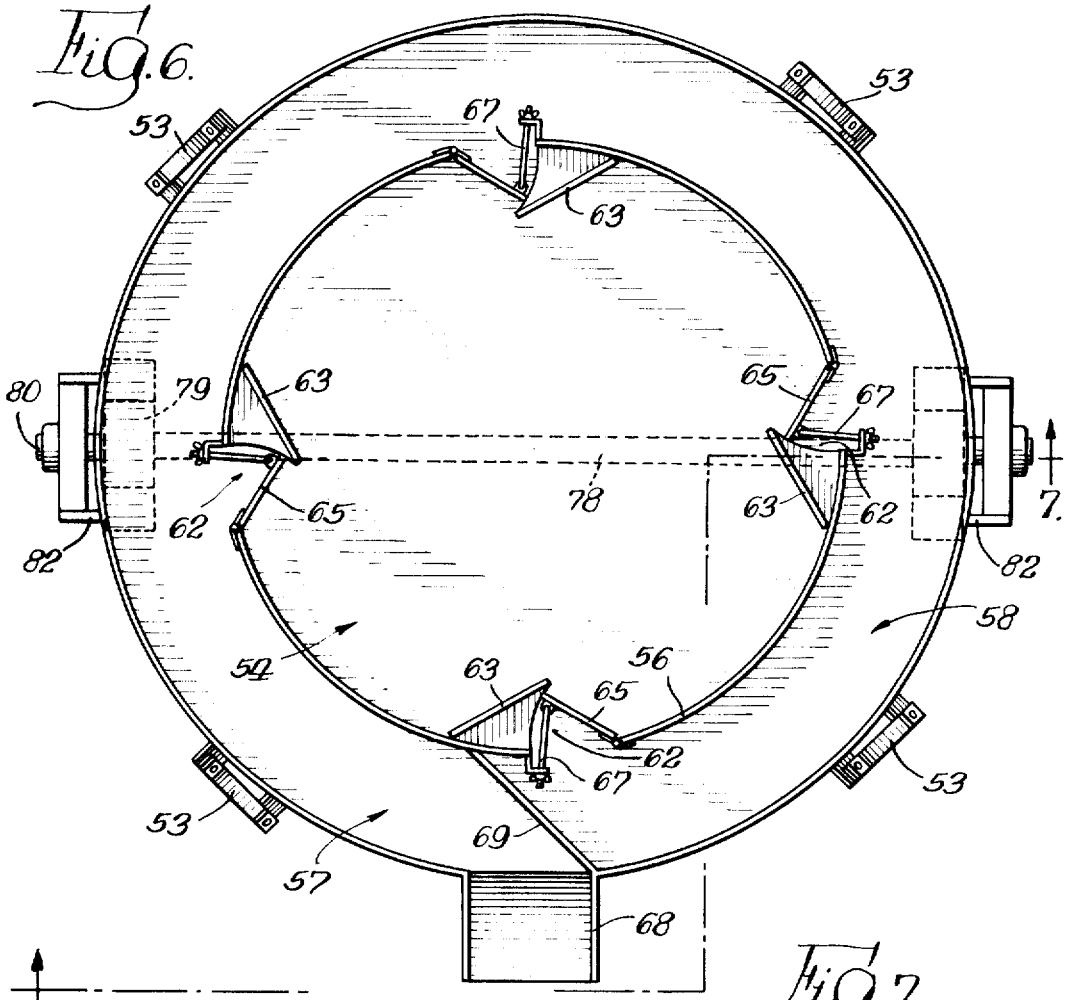
FIG. 6 is a view like FIG. 2 of a modified form of the invention.
Figure 7:
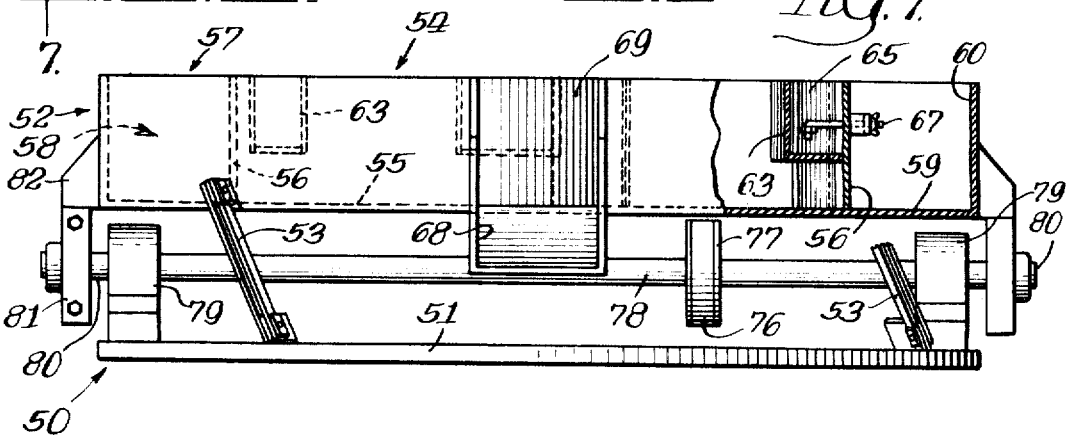
FIG. 7 is a side elevational view of the modified form of the invention shown in FIG. 6.

A somewhat modified form of the invention is shown in FIGS. 6 and 7. Referring to those figures, the feeder is provided with a base 50 in the form of a circular plate 51 supporting a frame 52 on the supports 53 similar to the supports 13. A first circular feeder 54 is provided with a bottom 55 and an outer upstanding circular wall 56. The second feeder 57 is spaced radially outwardly from the first feeder and is in the form of a circular channel 58 surrounding the first feeder with the channel having a bottom 59 and an outer side 60. A plurality of passages 62 establishes communication between the feeders 54 and 57. Mounted above each passage and extending only a portion of the way toward the bottom 55 are tabs 63 which serve to keep the level of the material adjacent the passages constant even though the actual quantity of material in the feeder 54 may vary from slightly above the bottom of the tabs to well above the same. Thus, the flow through the passages will be constant with the quantity of the flow being controllable by means of movable gate 65 as fixed by the position of the control rods 67. The feeder 57 is provided with a discharge spout 68 adjacent a dam 69 for directing material outwardly from the second feeder. The frame including the feeders are vibrated by means similar to that shown and described in conjunction with the first embodiment and include a motor driving a belt 76 for rotating a pulley 77 fixed on shaft 78 rotatably mounted in bearings 79 on the base plate 51. Eccentrics 80 at each end of the shaft are rotatable in bearings 81 and the vibrations thus created are transmitted to the frame through the medium of the brackets 82.

By reason of the provision of the tabs 63, that portion of the inner feeder 54 above the tabs acts in effect as a reserve supply of material although, if desired, a hopper similar to the hopper 31 may be provided for the apparatus.

In operation, material placed in the inner feeder 54 is moved therearound by the vibrations thereof caused by the motor and eccentrics. The material above the bottom of the tabs 63 is directed inwardly while the material below the tabs may enter the passages 62. The width to the passages is, of course, predetermined by the position of the gate 65. Thus, a predetermined level of the material is presented to each of the passages and hence the flow therethrough to the outer feeder 57 is uniform. The spout 68, like the spout 28, directs the material to a desired site of use and as the flow of the material is constant from the discharge spout the apparatus may be used in a continuous production process and be stationed along a moving line arranged for this purpose.

I claim:

1. A feeding device comprising: a first arcuately shaped vibratory feeder, a second arcuately shaped vibratory feeder, a passage providing communication between the first feeder and the second feeder, a gate controlling said passage, means providing a discharge from the second feeder, a frame carrying said feeders and said gate and passage, and means for vibrating said frame to move material in the first feeder through said communication means into the second feeder for movement therein to said discharge.

2. A feeding device comprising: a base, a frame resiliently mounted on said base, a first feed channel mounted on the frame, a second feed channel mounted on the frame, means carried by the frame and providing a passage between the first and second feed channels, means for metering flow through said passage, a storage hopper mounted on the base and having a discharge spout opening into the first feed channel, a second discharge spout extending outwardly from the second channel, and a vibrator mounted on the base and connected to the frame for vibrating the feed channels to cause material therein to flow from the first channel through the passage into the second channel and into the second discharge.

3. A feeding device comprising: a base, a frame resiliently mounted on said base, a first generally circular feed channel mounted on the frame, a second generally circular feed channel mounted on the base concentric with the first channel, means carried by the frame and providing a plurality of circumferentially spaced passages between the first and second feed channels, gates controlling said passages, a storage hopper mounted on the base above the first feed channel and having a discharge spout opening thereinto, a second discharge spout extending outwardly from the second channel, and a vibrator mounted on the base and connected to the frame for vibrating the feed channels to cause material therein to flow from the first channel through the passages into the second channel and into the second discharge.

4. A feeding device comprising: a base, a frame resiliently mounted on said base, a first generally circular feed channel mounted on the frame, a second generally circular feed channel mounted on the base concentric with the first channel and positioned vertically therebelow, means carried by the frame and providing a plurality of circumferentially spaced passages between the first and second feed channels, gates controlling said passages, a storage hopper mounted on the base above the first feed channel and having a discharge spout opening thereinto, a second discharge spout extending outwardly from the second channel, and a vibrator mounted on the base and connected to the frame for vibrating the feed channels to cause material therein to flow from the first channel through the passages into the second channel and into the second discharge.

5. A feeding device comprising: a base, a frame resiliently mounted on said base, a first generally circular feed channel mounted on the frame, a second generally circular feed channel mounted on the base concentric with the first channel and positioned radially outwardly therefrom, means carried by the frame and providing a plurality of circumferentially spaced passages between the first and second feed channels, gates controlling said passages, a storage hopper mounted on the base above the first feed channel and having a discharge spout opening thereinto, a second discharge spout extending outwardly from the second channel, and a vibrator mounted on the base and connected to the frame for vibrating the feed channels to cause material therein to flow from the first channel through the passages into the second channel and into the second discharge.

6. A feeding device comprising: a base, a frame, means mounting the frame on the base and providing limited rotational movement therebetween, a first generally circular feed channel mounted on the frame, a second generally circular feed channel mounted on the base concentric with the first channel, means carried by the frame and providing a plurality of circumferentially spaced passages between the first and second feed channels, gates controlling said passages, a storage hopper mounted on the base above the first feed channel and having a discharge spout opening thereinto, a second discharge spout extending outwardly from the second channel, and a vibrator mounted on the base and connected to the frame for vibrating the frame rotationally in the plane of said feed channels to cause material in said channels to flow from the hopper into the first channel, thence through said passages into the second channel and along said second channel to said second discharge spout.

*7. Apparatus for the controlled feeding of granular material from a hopper including a hopper having an opening defined in the bottom thereof and an interior wall, feeder means disposed beneath the hopper for receiving material therefrom, support means extending upwardly from said feeder means, a disc on said support means disposed adjacent and in vertical alignment with the opening in the hopper, said disc being spaced from said interior wall of said hopper to provide a flow space around said disc, said support means being rigidly secured to said feeder means, and means for vibrating said feeder means and said disc to thereby feed the material from the hopper.*

*8. Apparatus for the controlled feeding of granular material, as set forth in claim 7, wherein said support means is in the form of a threaded rod and said disc is provided with a threaded aperture therein and is adapted to be screwed on said rod for adjustable positioning of the same with respect to the opening in the hopper.*

*9. Apparatus for the feeding of material from a hopper including a hopper having an opening defined in the bottom thereof and an interior wall, feeder means disposed beneath the hopper for receiving material therefrom, a material deflecting surface extending transversely of the vertical axis of said opening, said surface being disposed adjacent and in vertical alignment with the opening in the hopper, means supporting said surface on said feeder means, said surface being spaced from the said wall to provide a flow space around said surface, and means for vibrating said feeder means and surface thereby to feed the material from the hopper.*

*10. In hopper feeding apparatus of the type wherein a hopper has a discharge opening in the bottom thereof and an interior wall, and feeder means beneath the hopper, the improvement comprising: a material deflecting surface positioned adjacent said opening and in vertical alignment therewith, said surface extending transversely of the vertical axis of said hopper opening, said surface being spaced from the interior wall of said hopper to provide a flow space around said surface, means supporting said surface on said feeder means, and means for imparting vibrations to said feeder means and surface to feed*

*material around said surface and through said hopper opening.*

References Cited

The following references, cited by the Examiner, are of record in the patented file of this patent or the original patent.

UNITED STATES PATENTS

| | | | |
|---|---|---|---|
| 120,745 | 11/1871 | Hutchins | 209—245 |
| 1,435,896 | 11/1922 | Hoskins | 222—501 |
| 2,233,652 | 3/1941 | Ticknor | 198—59 |
| 2,044,326 | 6/1936 | Pickell | 222—48 |
| 2,071,443 | 2/1937 | Weckerly | 222—199 |
| 2,276,382 | 3/1942 | Francis | 222—199 |
| 2,654,465 | 10/1953 | Sgriccia | 222—199 |
| 3,125,208 | 3/1964 | Secunda | 222—199 |

FOREIGN PATENTS

| | | |
|---|---|---|
| 87,395 | 2/1922 | Austria. |

RICHARD E. AEGERTER, *Primary Examiner.*

EVON C. BLUNK, *Examiner.*

E. A. SROKA, *Assistant Examiner.*

Disclaimer

Reissue No. 26,291.—*Robert M. Carrier, Jr.*, Jeffersonville, Ind. FEEDING APPARATUS. Reissue patent dated Oct. 31, 1967. Disclaimer filed May 2, 1969, by the assignee, *Carman Industries Inc.*

Hereby enters this disclaimer to claims 7, 8, 9 and 10 of said patent.

[*Official Gazette October 14, 1969.*]